C. Perley.
Cable Stopper
Nº 26,292. Patented Nov. 29, 1859.

Witnesses.
Lemuel W. Serrell
Thos. Geo. Harold

Inventor.
Charles Perley

UNITED STATES PATENT OFFICE.

CHARLES PERLEY, OF NEW YORK, N. Y.

CHAIN-CABLE STOPPER.

Specification of Letters Patent No. 26,292, dated November 29, 1859.

*To all whom it may concern:*

Be it known that I, CHARLES PERLEY, of the city and State of New York, have invented, made, and applied to use a certain new and useful Improvement in Chain-Cable Stoppers; and I do hereby declare that the following is a full, clear, and exact description of the construction and operation of the same, reference being had to the annexed drawing, making part of this specification, wherein—

Figure 1:
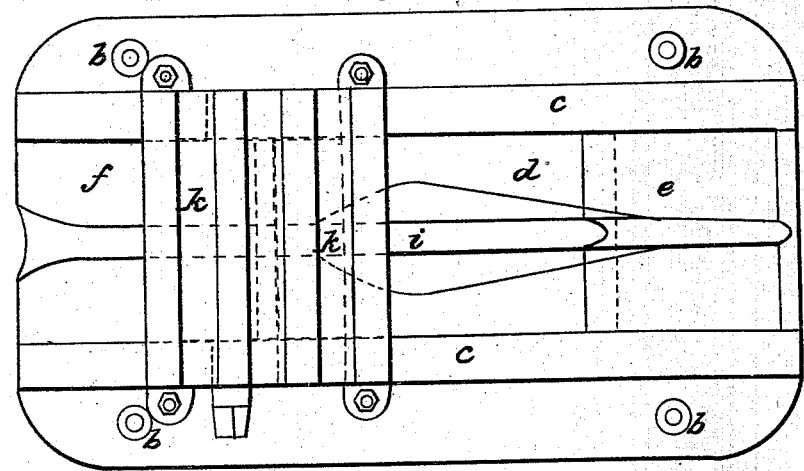
Figure 2:
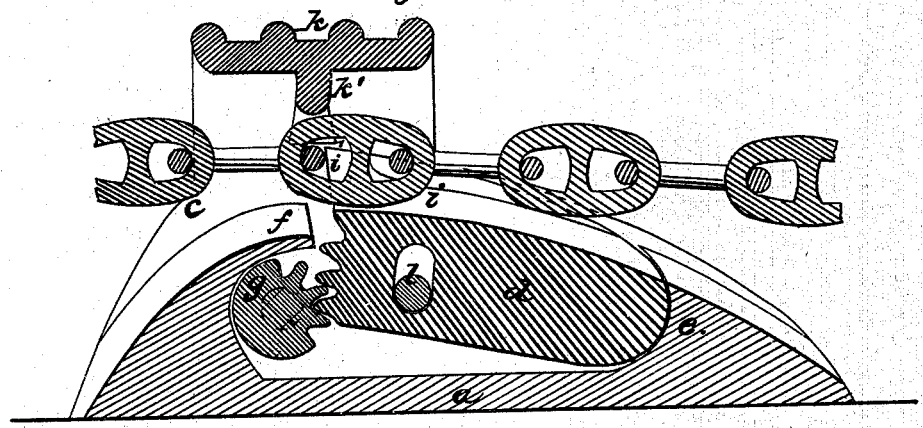
Figure 3:
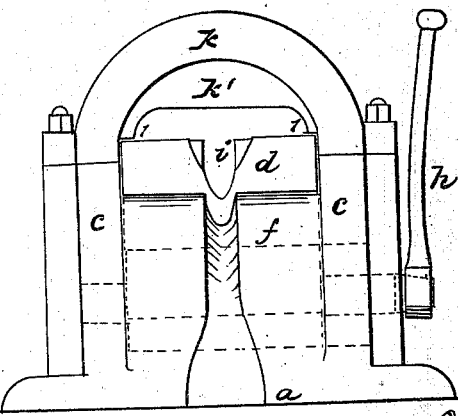

Figure 1, is a plan of my improved stopper. Fig. 2, is a vertical section of the same, and Fig. 3, is an end elevation.

Similar references indicate the same parts.

In handling a chain cable it has been usual heretofore to bring it up out of the chain locker and over a stopper that is provided with a lifting block and stationary jaw; when this lifting block is elevated the chain is raised out of the jaw and permitted to run off with the anchor and when said chain is to be stopped the lifting piece is lowered and the chain in consequence of the perpendicular weight to the chain locker is caught by said jaw. Some capstans and hoisting devices are not adapted to the use of this cable stopper at the chain locker, and apply such stopper near the hawser pipes where the chain is passing in nearly a straight line, while in other instances both a bow stopper and one at the chain locker are used. In both these instances the velocity of the chain in running out is so great that the links will not fall into the jaw because the chain being nearly in a stright line travels almost the same as if it were a smooth bar. The result has been that where the bow stopper formed as before mentioned has been used the chain could not be stopped when desired, and instances have occurred where the chain traveling with this great velocity has run entirely out and could not be stopped.

The nature of my said invention consists in providing a clamping bridge or plate over and in combination with said stopper whereby the chain is forced into the jaw and effectually stopped, and so completely is this under control of the operator that the chain can be caught and then payed out a few links at a time until the momentum of the chain and of the vessel are gradually stopped, thus avoiding the sudden jar and strain consequent upon a complete arresting of the chain.

In the drawing *a*, is the deck of the vessel or other part to which the stopper is attached by bolts *b, b*.

*c, c*, are side flanges between which the stopper pawl *d*, lies, and *e*, is a semicircular bearing for the same in the body of the stopper.

*f* is the grooved block against which the end of the stopper pawl *d*, lies when lowered down so as to form a smooth groove or channel in which the chain will freely run in paying out.

*g* is a pinion actuated by a lever *h*, and taking the end of the stopper pawl *d* by means of which said end can be elevated so that one of the horizontal links abuts against the end, holding the chain, while the vertical links stand in the groove *i*, as represented in Fig. 2.

In order to press the chain down into this groove and stop the same I provide the cross bridge *k*, with the rib *k'*, that is nearly over the end of the stopper pawl *d*, so that the chain is compelled to take the end of said pawl in consequence of being confined by the bridge *k*.

To prevent the stopper pawl *d*, rising too high, I provide the cross bar *l*, in a slot in said pawl, or else permit said pawl to rise against the projections 1, 1, on the bridge *k*, as seen in Fig. 3.

Having thus described my said invention I do not claim a jaw or stopper to take the links of a chain cable, but

What I claim and desire to secure by Letters Patent is—

The bridge (*k*,) over the chain, in combination with the cable stopper, for the purpose of forcing the chain into said stopper in the manner and substantially as specified.

In witness whereof I have hereunto set my signature this ninth day of November 1859.

CHARLES PERLEY.

Witnesses:
LEMUEL W. SERRELL,
THOS. GEO. HAROLD.